Figure 1:
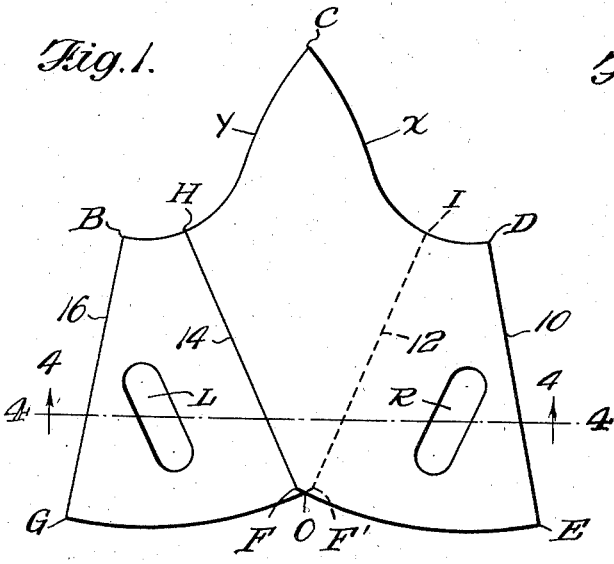

Dec. 9, 1958   W. R. SHAFFER   2,863,323
SPROCKET TOOTH AND ASSEMBLY
Filed Sept. 4, 1957   2 Sheets-Sheet 1

INVENTOR
William R. Shaffer,
BY Karl W. Flocks
ATTORNEY

Dec. 9, 1958 W. R. SHAFFER 2,863,323
SPROCKET TOOTH AND ASSEMBLY
Filed Sept. 4, 1957 2 Sheets-Sheet 2

INVENTOR
William R. Shaffer,
BY Karl W. Flocks
ATTORNEY

United States Patent Office 2,863,323
Patented Dec. 9, 1958

2,863,323

SPROCKET TOOTH AND ASSEMBLY

William R. Shaffer, Huntingdon, Pa., assignor to Wald Industries, Inc., Huntingdon, Pa., a corporation of Pennsylvania Application September 4, 1957, Serial No. 682,003

18 Claims. (Cl. 74—243)

The present invention generally relates to sprockets and the sprocket teeth members which can be used to form various types of sprockets. More particularly, this invention pertains to novel sprocket teeth which can be easily fastened in spaced relationship to one another to thereby form a sprocket of the desired pitch diameter and having the requisite number of teeth to engage a driving or driven member (e. g., a sprocket chain).

At the present time, nearly all of the sprockets used in connection with machinery are produced as a unitary whole by forging, stamping, molding, casting or machining, since these mass production methods usually assure the lowest manufacturing costs per sprocket. Each sprocket produced in accordance with any of the above-described manufacturing methods has a fixed pitch diameter and a fixed number of teeth which cannot be varied due to the fact that the teeth are an integral and continuous part of the entire sprocket. Consequently, once such a sprocket has been incorporated into a piece of machinery, the number of teeth cannot be decreased, increased or replaced without removing the entire sprocket and replacing it with another sprocket having a different pitch diameter. The aforementioned limitations upon the use of mass produced integral sprockets can sometimes be quite serious. For example, when one desires to substitute a new sprocket for the sprocket already in a machine, it may sometimes be difficult to immediately locate a substitute sprocket having the exact pitch diameter and the exact number of teeth desired. In such instances, it may be necessary to go to the time, trouble and expense of specially producing the desired type of substitute sprocket if the machine is to be put into operating condition within a reasonably short period of time. This is also true when one or more teeth of a sprocket are damaged seriously enough to necessitate the replacement of the entire sprocket.

These limitations or deficiencies have not gone unrecognized and a few prior art workers have attempted to develop sprockets wherein the individual teeth are separable from the main body of the sprocket, but generally speaking, such sprockets have not enjoyed any considerable degree of commercial success because of certain inherent structural and design limitations. This invention presents a unique concept for overcoming some of the aforementioned limitations of integral sprockets. The sprocket tooth construction of this invention is new and different, is assembled in a different way and performs a different function than any prior art types of sprocket teeth, as will be more fully described hereinafter.

An object of this invention is to provide a new type of sprocket tooth which, when used in multiples of each other together with other simple components, can provide a sprocket of any desired pitch diameter and with any desired number of teeth.

A further object of this invention is to provide a sprocket constructed of individual teeth members which can be readily removed and replaced with a similar tooth when the original tooth becomes worn or damaged.

Another object of this invention is to provide a sprocket tooth which is capable of being laterally interlocked with the surfaces of adjacent sprocket teeth.

Another object of this invention is to provide a novel sprocket tooth form which conforms to the American Standards Association (A. S. A.) specifications and which results in a sprocket outline that varies as the number of teeth varies so as to closely maintain the A. S. A. form for every sprocket diameter.

An additional object of this invention is to provide a novel sprocket tooth construction whereby the full load received by one sprocket tooth is capable of being at least partially distributed to other adjacent sprocket teeth.

A further object of this invention is to provide a variety of sprocket components which are capable of receiving and holding sprocket teeth in the form of a sprocket wheel.

A particular object of the invention is to provide a sprocket tooth with lateral surfaces consisting of slots and projections which are adapted to slide within and interlock with slots and projections on the lateral surfaces of adjacent sprocket teeth.

Another specific object of this invention is to provide a sprocket tooth having elongated slots therein which permit adjacent teeth to be interlocked in a variety of positions.

Another object of this invention is to provide a sprocket tooth having a main tooth section, interlocking tooth sections which are less than the full width of the tooth section and means for interlocking said interlocking tooth sections.

Figure 2:
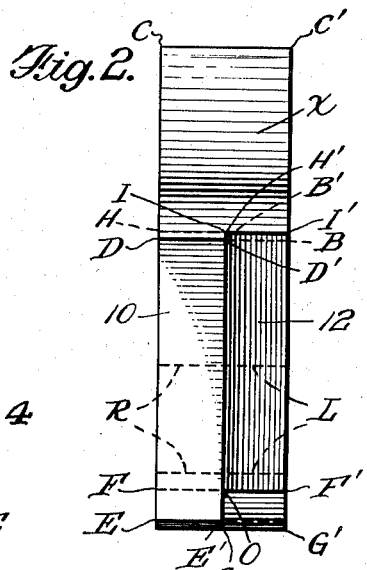
Figure 3:
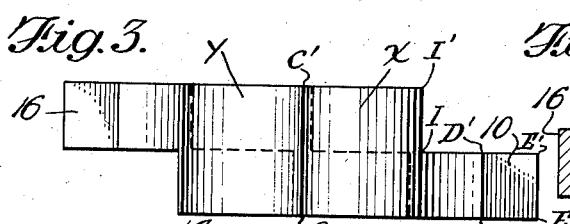
Figure 4:
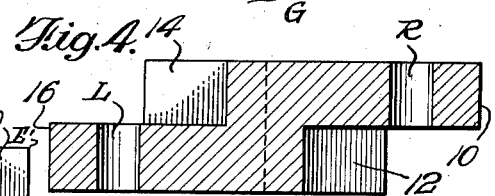
Figure 5:
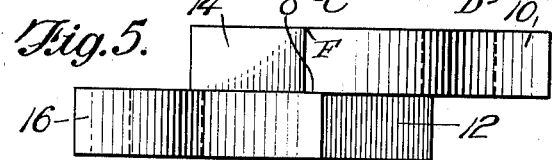
Figure 6:
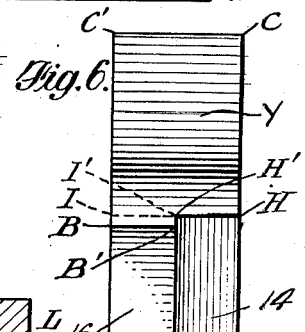
Figure 7:
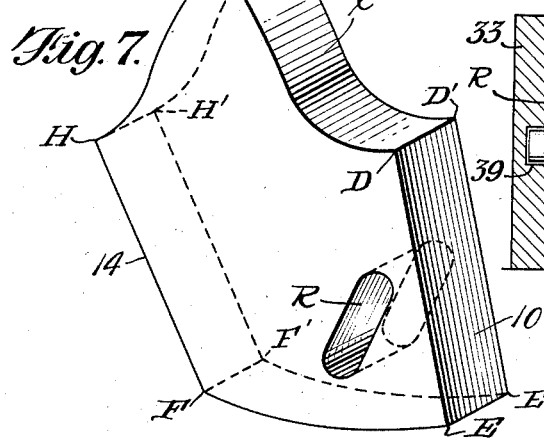
Figure 8:
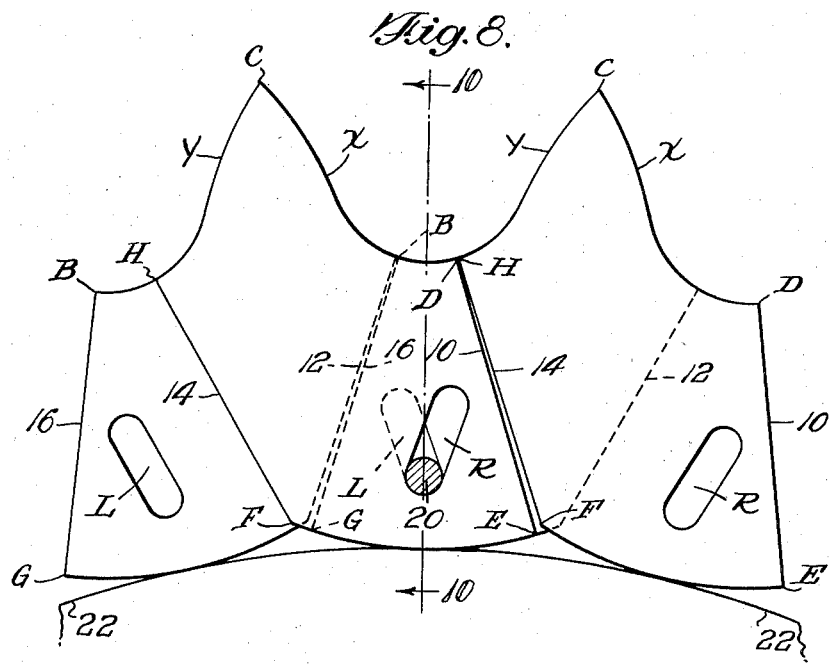

Other objects and advantages of the instant invention will be apparent from the following description taken in conjunction with the accompanying drawings, wherein:

Figure 1 is a front view of one embodiment of a novel sprocket tooth in accordance with this invention, Figure 2 is a right side view of Figure 1, Figure 3 is a top view of Figure 1, Figure 4 is a sectional view of Figure 1 along the line 4—4, Figure 5 is a bottom view of Figure 1, Figure 6 is a left side view of the sprocket tooth shown in Figure 1, Figure 7 is a perspective view illustrating one embodiment of a novel sprocket tooth fragment in accordance with this invention, Figure 8 is a front view of two interlocked sprocket teeth of the type shown in Figures 1–6, Figure 9 is a front view of two interlocked sprocket teeth of the type shown in Figures 1–6, and Figure 10 is a side view of Figure 8 taken along line 10—10.

One of the simplest embodiments of the sprocket teeth of this invention is illustrated in Figures 1–6. In these figures it will be seen that the sprocket tooth comprises a tooth edge portion C—C', tooth surface X curving downwardly from the right side of tooth edge C—C' and tooth surface Y curving downwardly from the left side of tooth edge C—C'. Tooth surface X is actually bounded by the letters C—D—D'—I—I'—C' and tooth surface Y is bounded by the letters

C—H—H'—B'—B—C'

It is thus seen that the respective tooth surfaces X and Y which are illustrated in the drawings do not present a perfectly rectangular outline when viewed either from the top or from the side. The sprocket tooth also comprises two pairs of side faces, the first pair of side faces being 10 (D—D'—E'—E) and 12 (I—I'—F'—O) which are positioned to the right of tooth edge portion C—C' and two other pair of side faces being side faces 14 (H—H'—O—F) and 16 (B—B'—G'—G) which are positioned to the left of tooth edge portion C—C'.

Side faces 10 and 12 lie in planes which diverge away from each other in a downward direction, as do side faces 14 and 16. The angle of divergence between the planes drawn through the side faces of either pair may range between about 20 and 60 degrees and preferably between about 30 and 45 degrees.

The innermost side faces of each pair of side faces converge toward each other in a downward direction. As shown the planes through each of these innermost faces would intersect at the line F—O—F' or a point closely adjacent to the bottom of the sprocket tooth. The angle between such planes may range between about 30 and 60 degrees, and preferably approximately 45 degrees.

The outermost side faces of each of said pairs of side faces diverge away from each other in a downward direction. Planes drawn through said outermost side faces may diverge away from each other at an angle between about 5 and 45 degrees, and preferably at an angle of about 30 degrees. With respect to the vertical centerline C—F of the sprocket tooth, the planes drawn through each of said outermost side faces would diverge downwardly from the tooth edge and away from the vertical centerline at an angle of between about 5 and 35 degrees.

Side sections are associated with the outermost side face of each of the previously mentioned pairs of side faces. The side section associated with outermost side face 10 could be considered as that area generally bounded by the letters I—D'—E'—O—F—E—D and the side section associated with the outermost side face 16 could be considered as that area generally bounded by the letters H'—B'—G'—O—F'—G—B. As shown, each of these side sections has a thickness equal to about one half the thickness of the entire sprocket tooth and each of the side sections is of approximately the same area when viewed either from the top, bottom or sides. In fact, as shown, each side section is essentially a mirror image of the other side section. Aside from the fact that the two side sections are on opposite sides of a plane drawn through the tooth edge and centerline, they also differ in that they lie on opposite sides of a plane passing perpendicular to said first plane and midway through the flat side of the tooth.

In each side section there is located at least one elongated slot, such as those shown as R and L in the drawings. In each sprocket tooth these elongated slots converge toward each other in a downward direction. When centerlines are drawn through these slots, the lower end of these centerlines will be closer to the vertical centerline C—F than the upper ends of the centerlines passing through the slots. These slot centerlines may converge at an angle of between about 30 and 60 degrees, and preferably at an angle of approximately 45 degrees.

The sprocket tooth of this invention may be produced in a number of ways. For example, the sprocket tooth can be produced in a single operation by molding, casting, etc., or the sprocket tooth can be produced by first manufacturing fragments of a sprocket tooth and thereafter fastening or bonding these fragments into a complete and whole sprocket tooth by cementing, welding, laminating, bolting, interlocking grooves, metallic pins, etc. In Figure 7 there is shown a sprocket tooth fragment which could easily be joined by welding to another such fragment (turned 180 degrees) to thereby produce the sprocket tooth shown in Figures 1–6. This invention is of course not limited to this exact shape and configuration.

The sprocket teeth may be made from any available practical material, including steel, iron, bronze, laminated fibers and plastics (e. g., nylon). The preferred materials are powdered iron alone or powdered iron with copper as an alloy, or iron with carbon to make steel.

Figure 8 illustrates how the novel sprocket teeth of this invention can be disposed closely together in side-by-side relationship so as to function as a sprocket. In this drawing two sprocket teeth are shown in an intermeshing and interlocking relationship and the letters and numbers used correspond to the letters and numbers used in Figures 1–7. This drawing shows that when two sprocket teeth are brought closely together the right side section of the left tooth overlaps and to a degree intermeshes with the left side section of the right tooth so that side face 14 of the right tooth abuts or closely approaches the side face 10 of the left tooth. In this position elongated slot R of the left tooth overlaps elongated slot L of the right tooth and the area of overlap is sufficiently great to permit the insertion of a locking pin 20, which is designed to extend through and preferably beyond said slots. It is obvious that any number of sprocket teeth might be linked together in this manner. In this figure a portion of the hub plate 22 upon which the bottoms of the sprocket teeth are designed to rest has been shown. The diameter and curvature of the hub plate 22 may of course be chosen to suit the needs of the user.

Figure 9:
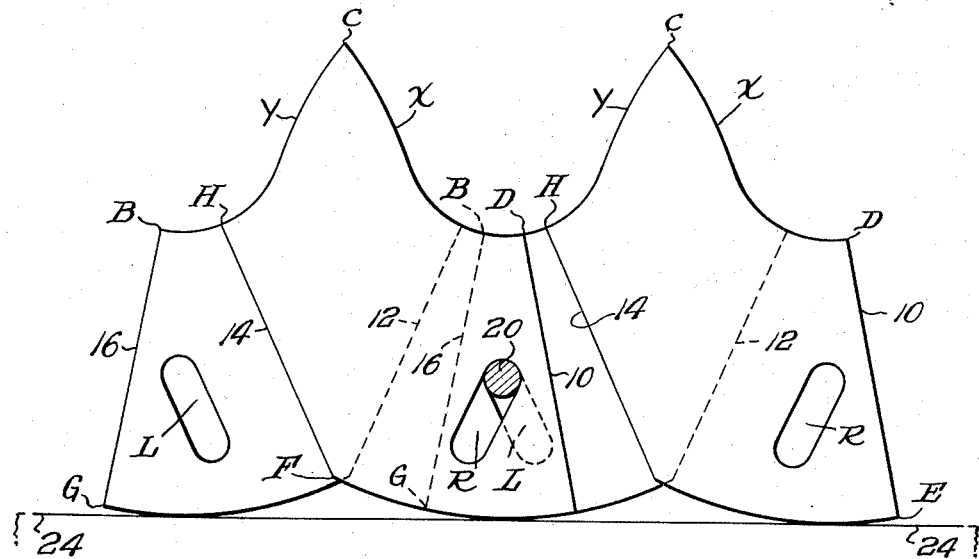

Figure 9 is quite similar to Figure 8, the main difference being that the hub plate 24 of Figure 9 is essentially straight rather than curved as is the hub plate 22 of Figure 8. The effect of increasing the diameter of the hub plate insofar as the individual teeth are concerned is that the right face 10 of the left tooth will be further away from the left face 14 of the right tooth than was the case in Figure 8. Also the locking pin 20 will engage the upper extremity (when hub plate 24 is a straight line) of elongated slots R and L, rather than the lower extremity (as was the case with Figure 8). It is thus seen that the position of a locking pin within the elongated slots of the instant novel sprocket tooth will vary with the varying diameter hub plates used in connection with the sprocket teeth.

It will also be seen that when using the novel sprocket tooth according to this invention the position of the locking pins with respect to both the teeth and the edge of the hub plate moves outward along a radial line. Thus, for any given number of teeth on a sprocket, it can be shown that there will be only one position of the locking pins 20.

Figure 10:
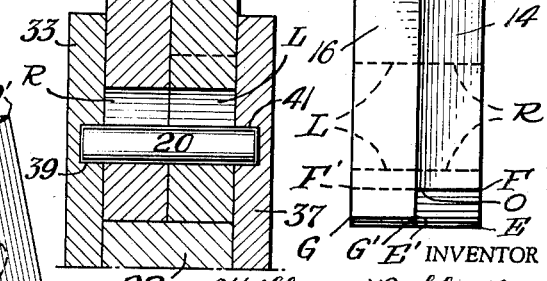

Figure 10 is a view along line 10—10 of Figure 8 and illustrates how the sprocket teeth of this invention may be assembled when utilizing locking pin 20, hub plate 22, side plates 33 and 37 and locking pin grooves 39 and 41. The sprocket teeth are assembled around the outer periphery of the hub plate 22, locking pins 20 are inserted through the elongated slots R and L of adjacent teeth and side plates 33 and 37 are placed in position with the ends of the locking pins 20 in the annular grooves 39 and 41. In this manner the sprocket teeth will be held in place, with their vertical axis substantially radial to the sprocket, and correctly spaced with respect to each other for proper operation. To prevent any circumferential slippage, one lock pin may be made to extend through holes drilled in the side plates.

Instead of using hub plates to assemble the individual sprocket teeth into a ring, one may also use spacer rings and side plates. Also, it is not necessary that the locking pins protrude beyond the front or back surfaces of the tooth.

It is also seen that the sprocket tooth of this invention presents a continuous upper bearing surface (e. g. for a sprocket chain) regardless of whether the elongated slots are disposed as shown in Figure 8 or as shown in Figure 9 (e. g., in a close or not so close interlocking relationship).

The above described shape and structure of the sprocket tooth of this invention has a number of novel and important advantages. First of all, the novel sprocket teeth of this invention permit one to construct a sprocket having any desired number of teeth by simply adjusting the extent to which the adjacent teeth interlock with each other. For example, when adjacent sprocket teeth have their abutting faces pushed together as closely as possible (as in Figure 8) the resulting sprocket will contain the minimum number of teeth and the minimum pitch diameter. On the other hand, by moving the adjacent sprocket teeth so that the abutting faces are not disposed closely together (as in Figure 9), one may produce a sprocket containing more than the minimum number of teeth and a pitch diameter greater than the minimum pitch diameter. The greater the distance between each of the sprocket teeth the greater will be the pitch diameter and the number of teeth in the sprocket.

It is further apparent that the uniquely constructed sprocket teeth of this invention, in addition to permitting a considerable flexibility insofar as varying the number of teeth and the pitch diameter is concerned, have the further advantage that they will reduce impact and sprocket torsional fatigue loading due to the fact that the intermeshing of adjacent sprocket teeth tends to distribute such loads over several teeth instead of only one tooth.

Although the novel sprocket teeth of the invention have been shown in Figures 8, 9 and 10 as being mounted on a hub plate and between side plates, it should be understood that the manner in which the sprocket teeth are mounted so as to form a sprocket wheel is not the most important feature of novelty insofar as this invention is concerned, since the methods for assembling the novel sprocket teeth of this invention into a sprocket wheel could be varied considerably by those skilled in the art. Applicant particularly prefers that the sprocket teeth of this invention should be mounted in the same (or similar) fashion that the sprocket teeth of the patent application Serial No. 587,342 are mounted (the applicant in this application is one of the applicants in Serial No. 587,342), which has matured as Patent No. 2,824,458. More particularly, applicant would prefer to utilize the sprocket teeth supporting means shown in Figures 11, 12, 13, 15–28, 32 and 33. Minor modifications of the embodiments shown in the cited figures of Serial No. 587,342 may be made if necessary to accommodate the sprocket teeth of this invention.

Although the foregoing disclosure has been particularly directed to sprocket teeth and sprockets, those skilled in the art will readily appreciate that the teachings of this invention are applicable to other types of driving mechanisms such as gears, gear wheels, etc.

Whereas, the sprocket teeth shown in the drawings have been shown to have specfic configurations, it will be understood that the invention is by no means limited to these specific sizes, angles, curvatures or size ratios of one portion to another, since such factors are not critical so long as the hereinbefore described considerations regarding the novel functions which the sprocket teeth are to perform are kept in mind.

By utilizing the teachings of the present invention, it is possible to have instantly available sprockets with a wide variety of pitch diameters by merely stocking a central hub plate, a few side plates, a few pitch rings or spacer rings and an adequate supply of interchangeable sprocket teeth. It is also apparent that the desired sprocket may be assembled in a relatively short period of time and the assembled sprocket will be exactly the size desired for the operation to be performed. Worn or damaged teeth can be readily replaced without even removing the sprocket hub plate from its shaft.

Also, although the foregoing description has been primarily directed to single chain sprockets, it is obvious that multiple chain sprockets could easily be fabricated using the same basic components together with teeth spacers. It is also clear that sprocket drives utilizing only an annular tooth ring could be easily adapted to circular objects such as tumbling drums, retorts, autoclaves, etc. Sprockets having a non-circular outline can be fabricated from the same basic teeth and likewise sprockets having an infinite radius of curvature (rack form) can be produced.

It will be obvious to those skilled in the art that numerous changes and modifications may be made without departing from the spirit of the invention and therefore the invention is not limited to what is shown in the drawings and described in the specification but only as indicated in the appended claims.

What is claimed is:

1. A sprocket tooth which comprises a tooth edge portion, two tooth surface portions which extend downwardly from each side of said tooth edge portion, one pair of side faces extending downwardly from the lower extremity of one of said tooth surface portions, and another pair of side faces extending downwardly from the lower extremity of the other tooth surface portion, the side faces in each pair diverging away from each other in a downward direction, the side faces in each pair having a thickness which is less than the maximum thickness of said tooth edge portion, side sections associated with the outermost side face of each of said pairs of side faces, the bulk of each of said side sections being positioned in different planes with respect to each other, each of said side sections containing at least one elongated slot, the elongated slots in each of said side sections converging toward each other in a downward direction.

2. The sprocket tooth according to claim 1 wherein the innermost side faces of each pair of side faces converge toward each other in a downward direction.

3. The sprocket tooth according to claim 2 wherein the planes drawn through said innermost side faces would intersect at a point closely adjacent to the bottom of the sprocket tooth.

4. The sprocket tooth according to claim 3 wherein the angle between said planes is between about 30 and 60 degrees.

5. The sprocket tooth according to claim 4 wherein said angle is approximately 45 degrees.

6. The sprocket tooth according to claim 2 wherein the angle between planes drawn through said innermost side faces is between about 30 and 60 degrees.

7. The sprocket tooth according to claim 6 wherein said angle is approximately 45 degrees.

8. The sprocket tooth according to claim 1 wherein the outermost side faces of each of said pairs of side faces diverge away from each other in a downward direction.

9. The sprocket tooth according to claim 8 wherein planes drawn through said outermost side faces diverge away from each other at an angle of between about 5 and 45 degrees.

10. The sprocket tooth according to claim 9 wherein said angle is approximately 30 degrees.

11. The sprocket tooth according to claim 8 wherein planes drawn through each of said outermost side faces would diverge downwardly from the tooth edge and away from the centerline of the sprocket tooth at an angle of between about 5 and 35 degrees.

12. The sprocket tooth according to claim 1 wherein each of said side sections is wider at the bottom than at the top.

13. The sprocket tooth according to claim 12 wherein the thickness of each of said side sections is approximately equal.

14. The sprocket tooth according to claim 12 wherein each of said side sections closely resembles the sector of an annulus.

15. The sprocket tooth according to claim 1 wherein the lower end of the centerline of said elongated slot is closer to the vertical centerline of the sprocket tooth than is the upper end of the centerline of said elongated slot.

16. The sprocket tooth according to claim 15 wherein said slot centerlines converge together in a downward direction at an angle of between about 30 and 60 degrees.

17. The sprocket tooth according to claim 16 wherein said angle is approximately 45 degrees.

18. The sprocket tooth according to claim 1 wherein the angle of divergence between the planes drawn through the side faces of either pair ranges between approximately 20 and 60 degrees.

References Cited in the file of this patent

UNITED STATES PATENTS

| | | |
|---|---|---|
| 382,079 | Ewart | May 1, 1888 |
| 464,896 | Riddell | Dec. 8, 1891 |
| 568,837 | Cowen | Oct. 6, 1896 |
| 2,824,458 | Barland et al. | Feb. 25, 1958 |

FOREIGN PATENTS

| | | |
|---|---|---|
| 555,611 | France | March 26, 1923 |
| 948,981 | France | Feb. 7, 1949 |